US008190640B2

(12) United States Patent
Mincarelli et al.

(10) Patent No.: US 8,190,640 B2
(45) Date of Patent: May 29, 2012

(54) GROUP MANAGEMENT USING UNIX NIS GROUPS

(75) Inventors: John Mincarelli, Weare, NH (US); Scott Hager, Austin, TX (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/151,206

(22) Filed: Jun. 1, 2011

(65) Prior Publication Data

US 2012/0041984 A1    Feb. 16, 2012

Related U.S. Application Data

(60) Provisional application No. 61/373,227, filed on Aug. 12, 2010.

(51) Int. Cl.
*G06F 17/30* (2006.01)
*G06F 7/00* (2006.01)
(52) U.S. Cl. ........................ 707/785; 709/225
(58) Field of Classification Search ........................... None
See application file for complete search history.

(56) References Cited

U.S. PATENT DOCUMENTS

| | | | |
|---|---|---|---|
| 6,144,959 A | 11/2000 | Anderson et al. | |
| 6,529,909 B1 | 3/2003 | Bowman-Amuah | |
| 6,772,157 B2 * | 8/2004 | Barnett et al. | 707/999.01 |
| 7,206,934 B2 | 4/2007 | Pabla et al. | |
| 7,266,595 B1 | 9/2007 | Black et al. | |
| 7,428,723 B2 | 9/2008 | Greene et al. | |
| 7,533,141 B2 | 5/2009 | Nadgir et al. | |
| 7,591,005 B1 | 9/2009 | Moore | |
| 2002/0083414 A1 | 6/2002 | Cheng et al. | |
| 2002/0112045 A1 | 8/2002 | Nirkhe et al. | |
| 2003/0014386 A1 | 1/2003 | Jurado, Jr. | |
| 2003/0014509 A1 | 1/2003 | Jurado, Jr. | |
| 2003/0163438 A1 * | 8/2003 | Barnett et al. | 707/1 |
| 2004/0010499 A1 | 1/2004 | Ghosh et al. | |
| 2004/0054808 A1 | 3/2004 | Ekberg | |
| 2004/0249902 A1 | 12/2004 | Tadayon et al. | |
| 2005/0234978 A1 | 10/2005 | Minamino et al. | |
| 2008/0133533 A1 | 6/2008 | Ganugapati et al. | |
| 2008/0133753 A1 | 6/2008 | Clark | |
| 2011/0246527 A1 * | 10/2011 | Bitting et al. | 707/784 |

OTHER PUBLICATIONS

Jeff Weiss, "NIS/NIS+—LDAP Migration", 2003, Sun Microsystems, pp. 1-38.*
Elisa Bertino, "RBAC Models—Concepts and Trends", 2003, Elsevier Ltd., pp. 511-514.*

(Continued)

*Primary Examiner* — Jacob F Bétit
*Assistant Examiner* — Scott A Waldron
(74) *Attorney, Agent, or Firm* — Fenwick & West LLP

(57) ABSTRACT

In one implementation, a system for managing Groups in a Unix environment includes a group management engine and an NIS converter. A group information database stores information about Groups and their Members. The group management engine receives commands from Administrators of a Group to change attributes of Members in the Group. It accesses the database and makes the requested changes. The information in the database is not in an NIS-compatible format. The NIS converter accesses the database and generates an NIS group file that describes a Group and its Members in a format that is NIS-compatible. For example, the NIS group file can be incorporated into the master NIS group map using the #Include# <filename> construct.

10 Claims, 4 Drawing Sheets

OTHER PUBLICATIONS

James B.D. Joshi et al., "A Generalized Temporal Role-Based Access Control Model", IEEE Transactions on Knowledge and Data Engineering, vol. 17 No. 1, Jan. 2005, pp. 4-23.*
"Best Practices for Managing & Monitoring Active Directory and Group Policy", Mar. 15, 2007, NetIQ Corporation, pp. 1-13.*
Subhendu Aich et al., "STARBAC: Spatiotemporal Role Based Access Control", 2007, Springer-Verlag, pp. 1567-1582.*
"Sudo Manual", crawled by Web Archive on Jul. 11, 2004, available at www.gratisoft.us/sudo/man/sudo.html, pp. 1-8.*
Ghadi, A. et al. "Hierarchical Role Graph Model for UNIX Access Control" International Journal of Future Generation Communication and Networking, Jun. 2009, pp. 59-68, vol. 2, No. 2, [Online] [Retrieved on Jul. 9, 2010] Retrieved from the Internet<URL:http://www.sersc.org/journals/IJFGCN/vol2_no2/6.pdf>.
Hemmes, J. et al., "Cacheable Decentralized Groups for Grid Resource Access Control" Proceedings of the 7th IEEE/ACM International Conference on Grid Computing, 2006, pp. 192-199, [Online] [Retrieved on Jul. 12, 2010], Retrieved from the Internet<URL:http://portal.acm.org/citation.cfm?id=1513923.1513962&coll=ACM&dl=ACM&CFID=94650419&CFTOKEN=39869147>.

* cited by examiner

GROUP MANAGEMENT USING UNIX NIS GROUPS

CROSS-REFERENCE TO RELATED APPLICATION(S)

This application claims priority under 35 U.S.C. §119(e) to U.S. Provisional Patent Application Ser. No. 61/373,227, "Group Management using Unix NIS Groups," filed Aug. 12, 2010. The subject matter of all of the foregoing is incorporated herein by reference in their entirety.

BACKGROUND OF THE INVENTION

1. Field of the Invention

This invention relates generally to the management of groups for the Unix operating system.

2. Description of the Related Art

In Unix environments, the NIS (Network Information Service) group map is used to assign Users to Groups. This is the default Unix mechanism to provide security to files stored within the Unix environment. However, the NIS group map is an unsophisticated flat file that simply lists which Users are in which Groups. It understands Groups, and Members, and not much else. The default implementation also does not provide any more sophisticated functionality for the management of Groups.

In addition, the NIS group map is typically accessible only by Root Users of the system. In most company environments, the Root Users are members of the IT organization. However, most of the determinations of which individuals should belong to which Groups are made by members of other organizations (e.g., the engineering department, or the sales department, or the finance department), since they know which individuals require access to which files. The IT organization typically does not have insight into who should or should not be a Member of a specific Group and therefore be able to gain access to data stored within the associated NIS domain.

As a result, delay is introduced when changes are to be made to the group map. For example, if an engineering manager determines that a certain employee is to be added or removed from an NIS Group, the engineering manager must notify the IT organization, using appropriate procedures to safeguard against unauthorized changes. The IT organization then validates the request and makes the requested change, but operating on its own time schedule and priorities.

An alternative is to give the engineering manager Root access to the Unix environment. However, security can be compromised if errors are introduced by non-IT-qualified personnel making changes to enterprise level infrastructure, such as the master NIS group map.

Companies typically work within the limitations of the NIS system. They may build manual processes to implement changes to the group map. These processes can be time-consuming and error prone. In addition, with manual processes, it may be difficult to track changes to the NIS group map and to later produce an accurate history of these changes. This can pose regulatory or audit issues, or at least make it more difficult to comply with regulatory requirements or audit requests.

Thus, there is a need for better approaches to the management of Groups within Unix environments.

SUMMARY OF THE INVENTION

The present invention overcomes the limitations of the prior art by creating a hierarchy on top of the flat native NIS group map.

In one aspect, a system for managing Groups in a Unix environment includes a group management engine and an NIS converter. A group information database stores information about Groups and their Members. The group management engine receives commands from Administrators of a Group to change attributes of Members in the Group. It accesses the database and makes the requested changes. The information in the database is not in an NIS-compatible format. The NIS converter accesses the database and generates an NIS group file that describes a Group and its Members in a format that is NIS-compatible. For example, the NIS group file can be incorporated into the master NIS group map using the #Include# <filename> construct, and can be updated whenever there is a change that would affect the NIS group file.

The system enables more functionality than is available in the native NIS group map. For example, hierarchy, indirection and inheritance can be implemented in the system. In another aspect, different types of Administrators may be defined. For example, Owners may have authority to approve changes in Members for a Group, the SuperOwner may have authority to approve changes in Owners for a Group, and Approvers may have authority to approve changes in Members for a Group but only for a limited time period. One advantage of this approach is that Administrators generally do not have access to change the master NIS group map and do not have to be Root users.

More functionality can also be implemented for Members. For example, Membership in a Group can be defined relative to a time period, with the group management engine automatically executing the changes in Membership. For example, a Temporary Membership automatically ends on a termination date (earlier than the normal default termination date). A Future Membership automatically starts on a future joining date. More complicated time-based or conditional Memberships can also be implemented.

In another aspect, the system can include a log module that records changes to the Groups and Members. For example, the log module might produces log records which identify a Member, a change to the Membership, the Administrator (if any) making the change, the Group, and a time that the change was made.

Another aspect is automatic notification. A notification module can send notifications based on the commands executed by the group management engine. An example is a notification that a Member has been added, renewed or deleted from a Group. Another example is a notification that a Membership is about to expire from a Group. Notifications can be sent to Members, Administrators or other interested parties.

In another aspect, functionality for Group ownership registration can be implemented through a registration module. The module enables automatic registration for Group ownership when a Member of the Group makes a request. If a non-member requests ownership, a Member could be notified and requested to confirm or deny the request. Additionally, there might be a time mechanism where the first Member in the Group is registered as the Owner if no Owner has been registered after a configurable time limit.

Other aspects of the invention include methods corresponding to the devices and systems described above.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
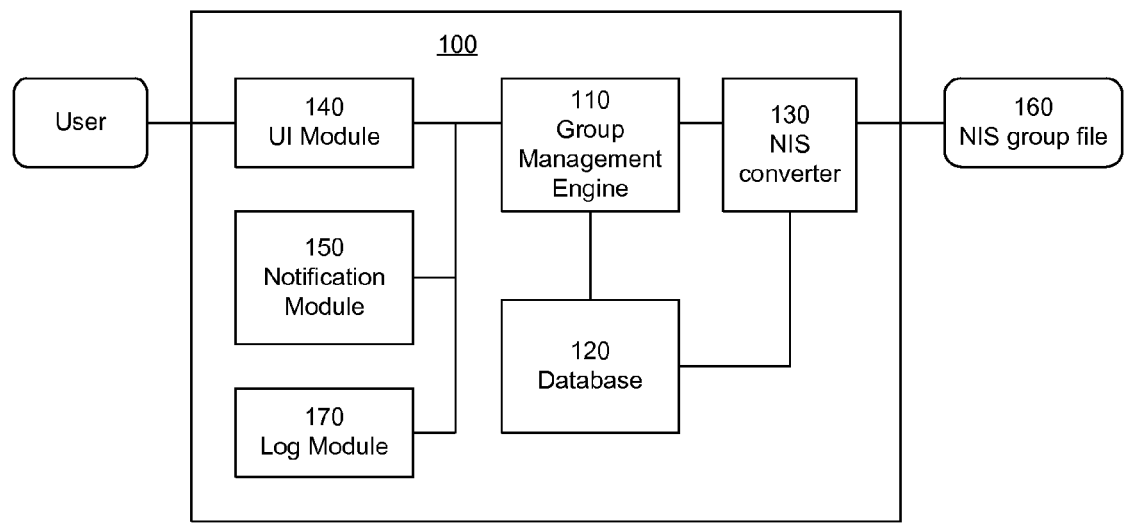
FIG. 1 is a block diagram of a group management system according to the present invention.

FIG. 1 is a block diagram of a group management system 100 according to the present invention. The system 100 includes a group management engine 110, a group information database 120, an NIS converter 130, a log module 170, a user interface module 140 and a notification module 150. The system 100 enables management of Groups within the Unix environment, in a way that is more sophisticated than the default NIS group map.

The group management engine 110 is the module that implements most of the group management functionality described below. For example, it typically will execute commands received from the user (or other sources), access the database 120 and control other modules within the system. The group information database 120 stores information about the Groups. It can and typically will contain information beyond what can be stored in the NIS group map. The log module 170 records changes to the group information.

The NIS converter 130 accesses the database 120 and converts the information stored there into an NIS group file 160. The format of this file will be referred to as the NIS group map format or the NIS-compatible format. The file produced by the NIS converter 130 will be referred to as the NIS group file, or the NIS group map formatted file or the NIS-compatible file.

The UI module 140 is an interface between users and the system 100. As will be described below, the users of this system 100 do not have to be Root Users of the Unix environment. The notification module 150 is used to send notifications to users or others. Examples of these notifications will be described below.

In some sense, the group management system 100 is an additional "layer" on top of the native NIS group map. The NIS converter 130 is the bridge between the rest of the group management system 100 and the native NIS group functionality. The system 100 enables more sophisticated group management, tracking and implementing this management primarily in the group management engine 110 and group information database 120. The NIS converter takes the more sophisticated group management functionality and reduces it to an NIS group file, which is in a format that can be used by the native Unix environment (e.g., referenced by the master NIS group map).

For example, the native NIS map implementation can support the concepts of a Group, and which Users are Members of that Group. However, it cannot support the concepts of Owner of a Group, Approver of a Group, or hierarchical versions of these (e.g., Super Owner of a Group). Nor can it support the concept of temporary or time-based Members of a Group. However, these concepts can be implemented within the group management system 100.

Figure 2:
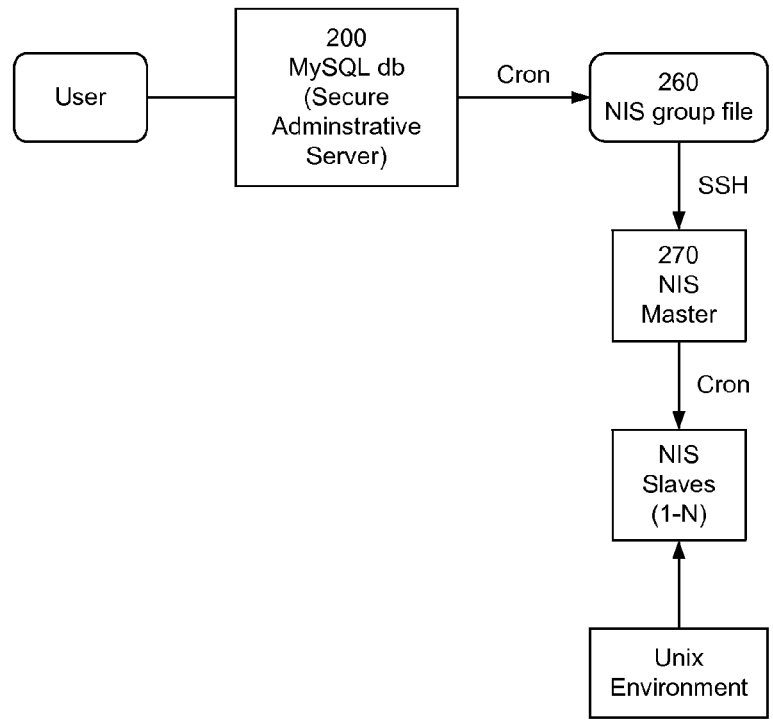
FIG. 2 is a block diagram of an example implementation of a group management system according to the present invention.

FIG. 2 is a block diagram of an example implementation of a group management system 200 according to the present invention. This example is based on a methodized, Unix command line interface. The NIS converter derives the NIS group file 260 from an internal database (MySQL) hosted on a secure server and disk infrastructure. In addition to the identification of Groups and their Members, this example implementation also supports the following Administrator roles for approving new Members for a Group:

Owner—may approve additions, deletions and renewals of Members, including permanently Super Owner—same authority as Owners, plus may approve additions, deletions and renewals of Owners and Approvers Approver—may approve additions and renewals of Members but only for a limited time period (less than any default for Owners) and not permanently; also may approve deletions of Members Other variations can also be implemented.

Note that the Administrators (i.e., Owners and Approvers) do not have to be Root users. Any security risk is significantly reduced because Administrators have access to only their own Group and do not have direct access to the master NIS group map 270. The group management system 200 may also implement logic that further controls the risk of misbehaving Administrators. With this approach, the personnel who are authorized and familiar with the intended use for the Group and its associated security/sensitivity issues can be made Administrators. They are then enabled to approve the addition and deletion of Members from the Group, without involving the IT organization and without having Root privileges for the Unix environment.

In addition, there can be different types of Members. For example, Members can be defined relative to different time periods:

Permanent—remains a Member until an Administrator deletes the Member or remains a Member for some default time period (e.g., for two years, or until the end of the current fiscal year)

Temporary—remains a Member for a certain time period or until a certain date, and then is automatically deleted (e.g., for 60 days, or from April 15 to June 15)

Future—current is not a Member, but will automatically become one after a certain time period or on a certain future date (e.g., starting in 30 days, or starting June 15)

Episodic—is added and deleted as a Member on some predetermined schedule (e.g., added for two weeks at each end of quarter)

Contingent—is added or deleted as a Member upon some condition (e.g., added upon approval of security clearance; or deleted upon leaving the company)

These time-based variations can also be applied to Administrators.

This implementation also supports the use of hierarchy and indirection. For example, Group A may be defined to include Users Alice, Bob, Charley and Groups X and Y. As another example, the Owners for Group A may be defined to include the User Derrick, Elvis and all of the Members in Group Z. Alternately, it may be defined to include all of the Owners of Group B.

Attributes, such as the time limits described above, may be inherited. For example. If Frank is a Temporary Owner of Group A, and the Owners of Group B are defined to include the Owners of Group A, then Frank will also be a Temporary Owner of Group B if his Temporary attribute is inherited or transferred. In the opposite approach, some or all attributes may not be inherited. Alternately, inheritance may be programmable by the end user.

The group management system also supports comments, for example to describe the context or purposes of Groups or any of its characteristics. For example, Gal may be set as a Temporary Owner of Group A for 30 days, with a comment that Gal is substituting for Harry, the usual Owner, while Harry is away on business.

Figure 3A:
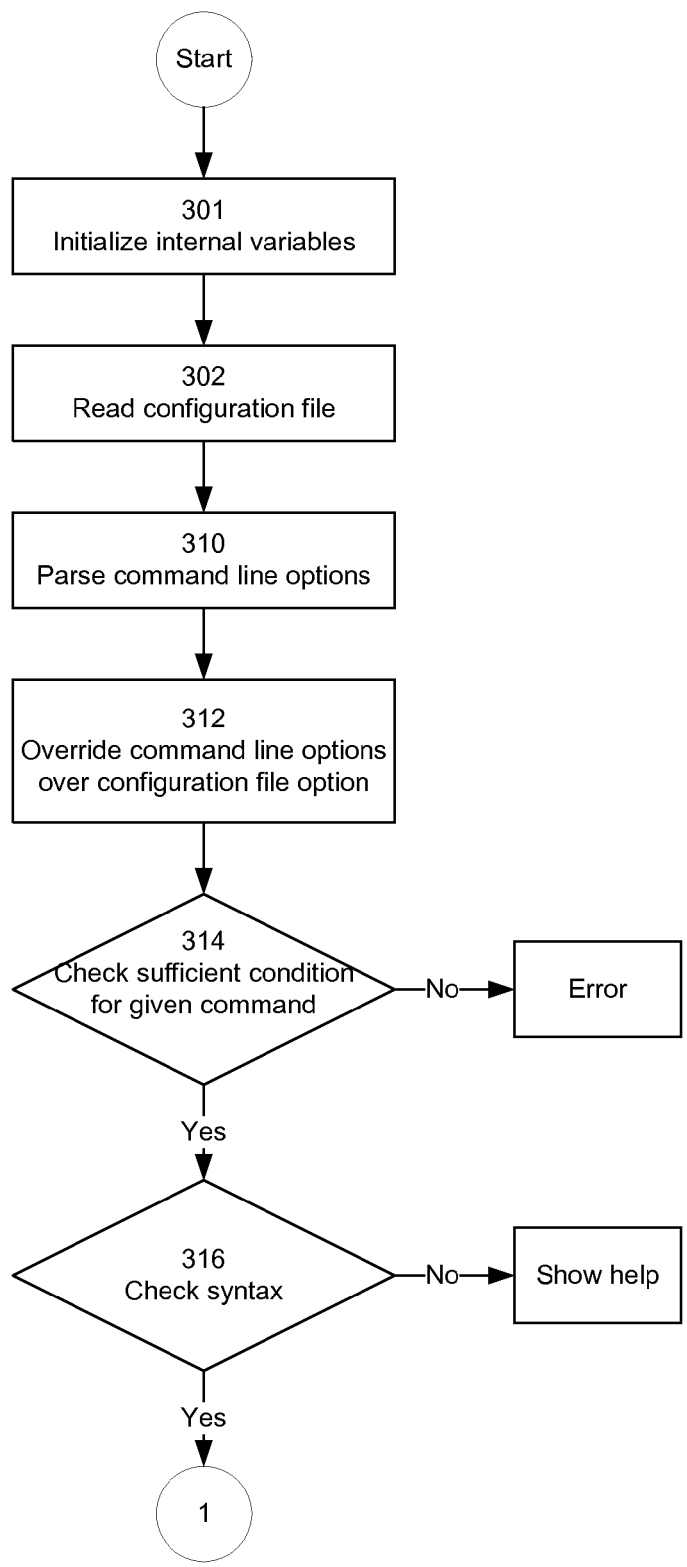
FIGS. 3A-3C is a flow diagram of an example method for executing user commands in a group management system.
Figure 3B:
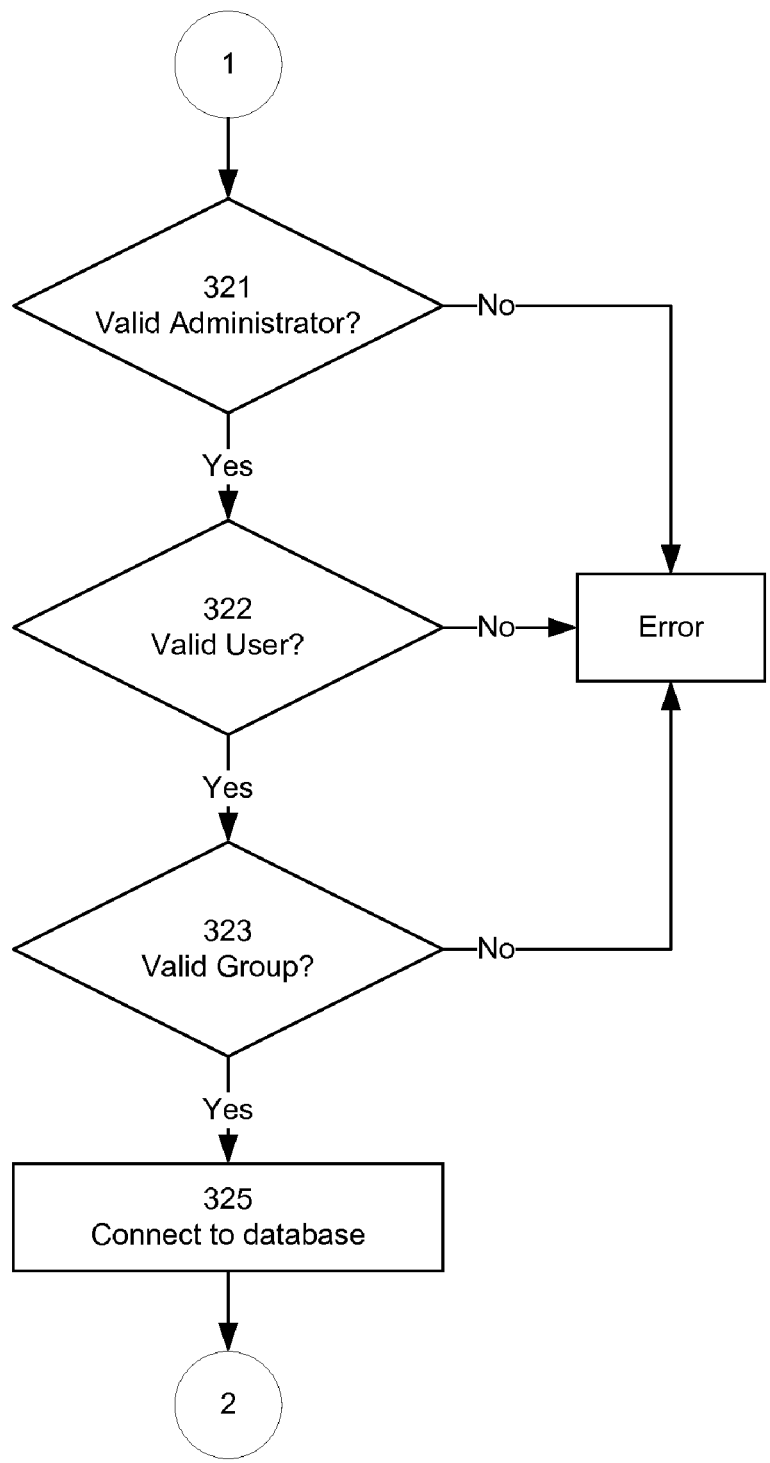
Figure 3C:
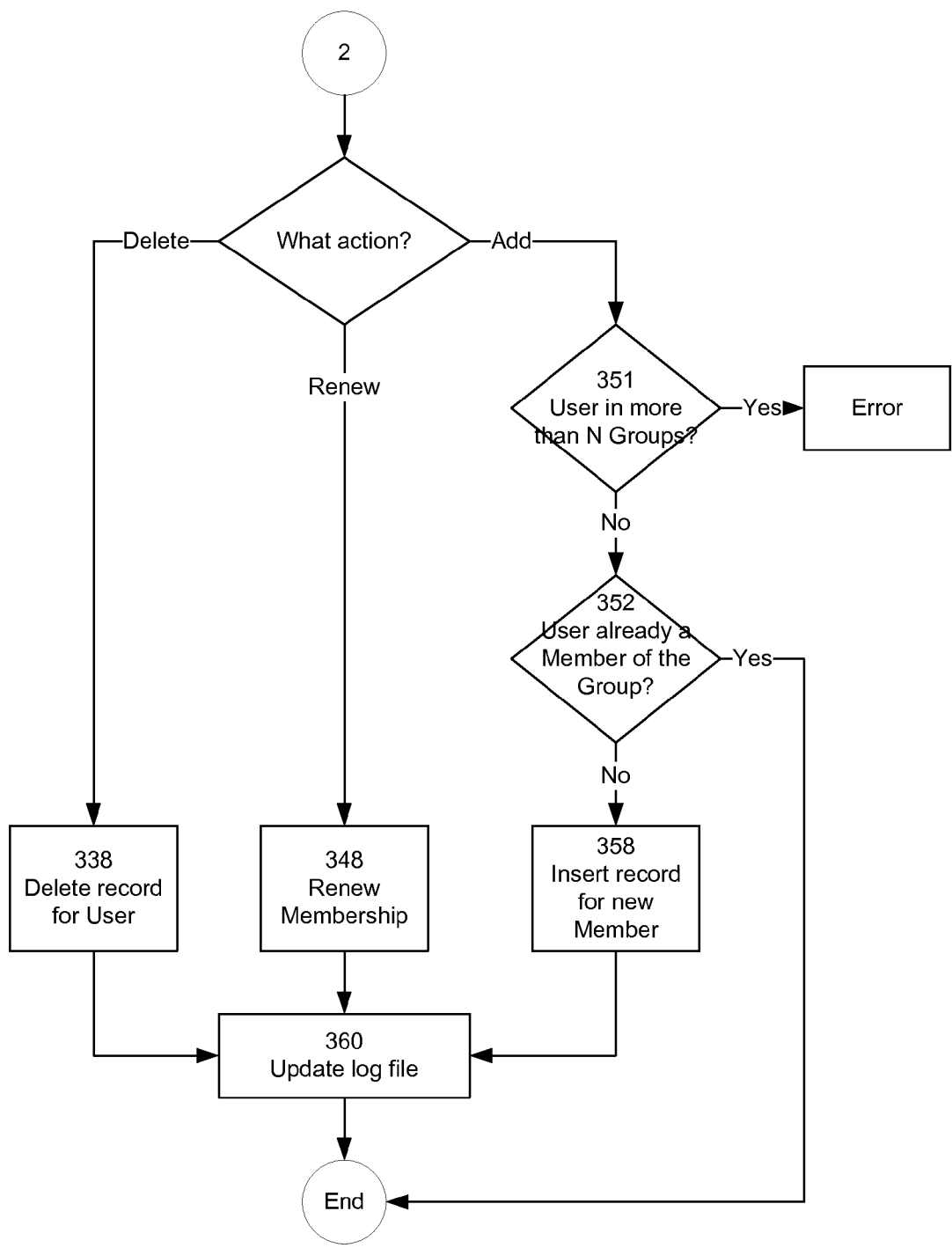

FIGS. 3A-3C is a flow diagram of an example method for executing user commands in a group management system. Generally speaking, steps 301-302 are initialization steps. Steps 310-316 read in and parse commands received at the Unix command line interface. Steps 321-323 validate Administrators, the User whose record is to be manipulated, and the Group, as necessary. Step 325 connects to the database.

Steps 351-358 show a process for adding Users to an existing Group. Optional step 351 is used to limit the number of Groups that any one User can join. Step 352 checks to see if the User is already a Member of the Group. In a variation of step 352, the system could also check if the User is also the same type of Member. For example, Iris may be a Temporary Member and the current command is to enter her as a Permanent Member. Step 358 updates the actual Group record in the database.

Steps 338 and 348 show processes for deleting or renewing Members in a Group, respectively. More specifically, in step 338, an existing Member record is deleted from a Group. In step 348, an existing Member record is changed. In this example, the change is a renewal, but other types of changes can also be implemented.

Step 360 creates a record of the transaction. The log file can be used for compliance or audit purposes. For example, the system may support searching of the log file, for example by function (add/remove/renew/expire), by Member, by Group, by Administrator and/or by time.

In this example, the system checks for validity of the Administrator, User/Member credentials, and validity of the affected Group. Appropriate fail safes can be built in to the system. If all security checks are validated the system makes the appropriate updates to the MySQL database.

In this implementation, the system understands the automated time-based attributes described above. The notification system automatically notifies a Member of a pending Termination such that the Member can extend his membership in the Group. Otherwise, time-based Terminations are fully automated and require no human interaction to enforce.

The output of the system is a simple flat file 260, which is automatically referenced as an Include file within the NIS group map 270. In one implementation, the NIS converter 130 updates the flat file 260 any time the group information database is updated. The NIS-compatible flat file 260 used with the #Include# construct is incorporated into the master NIS group map 270 via an automated cron event, configurable and typically set to 30 minutes or less, based on standard NIS makefile procedures.

The group information database is processed, possibly on a Group by Group basis, such that the resulting file(s) 260 can be used to create the master NIS group map. The mechanism for the data to be used is enabled by the use of the #Include# <filename> construct available within the NIS map architecture. This construct enables the ability to import information which would typically be contained locally within the NIS map.

As an example, the master NIS group map 270 may contain the following #Include# statement:
INCLUDE# groupedit.data
15273,15278,23111,1496,1519,1536,1511,1491,1507,
1464,1534,23024,1523,1477,1514,1522,1535,1478,
492,1515,1493,1532,1479,1518,1467,1533,1487,1494,
15 20,1506,1509,23051,1421,1498,23130,23005,5284,
23062,65594,65604,65605,65
606,65607,65608,65612,65611,65610,65609,65613
Each number identified after the #Include# <Include filename> is the group ID Number (GID) to be included. GID 1421 is boldfaced since it will be used as an example.

The NIS converter could create the following flat file entry 260 for GID 1421: sdv_amd:*:1421:jpencis,lindax,izac, kellyb,jolee,steved,mladd,pcollins,cchalla,rpe ters,btran,btran,myles,mladd,hengyi,ashkan,kellyb,dufresne, muniz,jpeters,georger,pcollins,wchang,tpowell, wbrooks,jwinkler,btran,carywei,gaur,mshih The notification system sends automated email notification to a User/Member when a User/Member is added, removed, renewed or otherwise modified for Group access. The automated email can also be sent to a mailing list, controlled by a group Administrator. The mailing list mechanism ensures that everyone of interest is notified of changes to the Members of the Group to avoid any access related issues which may impact the Group. In one implementation, the automated email to the User notifying of pending termination is set to seven (7) days and is configurable.

Not all Unix Groups need be managed using the system 200. For example, the system 200 could manage only those Unix Group(s) that need to be assigned an Owner for security, regulatory, audit, or other precautionary purposes.

This particular example is command line driven. Appendix A includes an example implementation as a command line utility named "groupedit." The appendix includes examples of the syntax, utility options, commands, notifications and log file.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In alternate embodiments, the invention is implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

The term "module" is not meant to be limited to a specific physical form. Depending on the specific application, modules can be implemented as hardware, firmware, software, and/or combinations of these. Furthermore, different modules can share common components or even be implemented by the same components. There may or may not be a clear boundary between different modules.

Depending on the form of the modules, the "coupling" between modules may also take different forms. Dedicated circuitry can be coupled to each other by hardwiring or by accessing a common register or memory location, for example. Software "coupling" can occur by any number of ways to pass information between software components (or between software and hardware, if that is the case). The term "coupling" is meant to include all of these and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

APPENDIX A

Example Command Line Drive Implementation

In this example, the command line utility is called "groupedit" Syntax.

groupedit -add -group [groupname] -user [username] -duration [no of days] [perm]
groupedit -remove -group [groupname] -user [username]
groupedit -renew -group [groupname] -user [username] -duration [no of days] [perm]
groupedit -add -approver [approver] -group [groupname]
groupedit -add -owner [owner] -group [groupname]
groupedit -add -suowner [owner] -group [groupname]
groupedit -remove -owner [owner] -group [groupname]
groupedit -help Options. The following options are supported:

-add -group [groupname] -user [username] -duration [no of days] [perm]
Adds [username] to the NIS Group [groupname]. The username must be valid in NIS. The groupname must be valid in NIS. The User can be a Member of a maximum of N Groups. If no duration is specified, it is assumed that the access is to be permanent. Only designated Owners have the authorization to grant permanent access. If you need this authority, please contact the Unix Group Owner.
-remove -group [groupname] -user [username]
Removes [username] from the NIS Group [groupname]. The username

APPENDIX A-continued

Example Command Line Drive Implementation must be an existing Member of the Group.
-renew -group [groupname] -user [username] -duration [no of days] [perm]
Renews the User access for the specified Group.
-add -approver [approver] -group [groupname]
Adds Approver for the specified Group to the groupedit database.
-add -owner [owner] -group [groupname]
Adds Owner for the specified Group to the groupedit database.
-add -suowner [owner] -group [groupname]
Adds SuperOwner for the specified Group to the groupedit database.
-remove -owner [owner] -group [groupname]
Removes Approver, Owner or SuperOwner for the specified Group from groupedit database.
-help
This option provides the detailed usage of this utility with all available switches.

Example Commands.
The following are examples of the groupedit command and options:

groupedit -add -group qcom-acl -user shager -duration 90
This will add "shager" to the group "qcom-acl" for 90 days.
groupedit -remove -group qcom-acl -user shager
This will remove "shager" from the group "qcom-acl".
groupedit -renew -group qcom-acl -user shager -duration 20
This will renew access for "shager" to the group "qcom-acl" for 20 days.

Example Notifications:

Notification to User upon being added as a Member to a Group:
--------------------------------
Please do not reply this mail.
Dear <username>,
You have been granted access to the restricted <groupname> Unix group by <administratorname> for 60 days on <date>.
ACCESS: Please wait 30 minutes after receiving this message, and then use <new member shell> to gain access. Please also ensure that no <Company> data leaves these secure disks. Please contact <name>@Company.com should you have any problems.
SECURITY: Please ensure that NO <Company> data leaves these secure disks. Any questions, please contact <name>@Company.com.
RENEWAL: Once you receive a message about your access expiring, you may request an extension by:
a.   contacting the AC you have been working with, or
b.   Filing a request for continued access to the <group-name> group and cc. <name>@Company.com.
Thank you,
--<Name>
--------------------------------
Notification to Member re: upcoming expiration from a Group:
--------------------------------
Please do not reply this mail.
Dear <username>,
Your access to the <groupname> group is set to expire on <date>.
If you require continued access to this group in order to work on <Company> related test cases, please contact the AC you have been working with or <Name> <email>. Otherwise you will be removed from this group and will no longer be able to access the data in this area.
Thanks,
<Name>
-------------
Notification to Administrator upon Member being added to a Group:
--------------------------------
Please do not reply this mail.
User <username> has been granted access to the restricted <groupname> Unix group by <administratorname> on <date>.
--------------------------------
Notification to Administrator upon Member being removed from a Group:
--------------------------------
Please do not reply this mail.
User <username> has been removed from group <groupname> by <administratorname> on <date>.
--------------------------------
Notification to Administrator upon Member being renewed for a Group:
--------------------------------
Please do not reply this mail.
User <username> account is renewed for 45 days for <groupname> Unix group by <administratorname> on <date>.
--------------------------------

APPENDIX A-continued

Example Command Line Drive Implementation

Sample Log File:

USER:RENEW:User jagat access is renewed for 120 days for qcom-acl by owner bobm on 2010-1-1 13:5:25 PST
USER:EXPIRED:User umakantg access expired for group <qcom-acl> on <2010-1-123:55:2 PST>
USER:EXPIRED:User froi access expired for group <qcom-acl> on <2010-1-2 23:55:1 PST>
USER:EXPIRED:User xcguo access expired for group <qcom-acl> on <2010-1-3 23:55:1 PST>
USER:ADD:User zohar added to group marvell_icc_033 by approver lamh on 2010-1-4 9:25:32 PST
USER:ADD:User dmeiraz added to group marvell_icc_033 by approver lamh on 2010-1-4 9:26:18 PST
USER:ADD:User zlzhang added to group qcom-acl by owner bobm on 2010-1-4 11:24:42 PST
USER:ADD:User nishb added to group lumen-temp by approver gvijay on 2010-1-4 14:2:15 PST
USER:ADD:User nishb added to group sps_montana by approver gvijay on 2010-1-4 14:2:26 PST
USER:ADD:User qwu added to group marvell_pt_005 by approver lamh on 2010-1-4 15:9:42 PST
USER:RENEW:User ebhatch access is renewed for 30 days for qcom-acl by approver nffrench on 2010-1-4 15:21:23 PST

What is claimed is:

1. A group management system for managing groups in a Unix environment, the system comprising:
 a group information database hosted by a secure server and storing information about groups and their members, wherein the group information database stores hierarchical information and attributes about groups and their members, and;
  wherein the group information database is a structured query language (SQL) database;
 a non-transitory machine-readable medium storing executable instructions, the instructions comprising:
  a group management engine that accesses the group information database, the group management engine executing commands received from administrators of a group via the Unix command line interface to change attributes of members in the group,
   wherein the group management engine operates on the hierarchical information and supports inheritance of the attributes based on the hierarchical information,
   wherein at least one member is defined as an episodic member, whose membership repeatedly starts and ends according to a predetermined schedule, the group management engine automatically adding and deleting the member defined as an episodic member according to the predetermined schedule,
   wherein the administrators include roles for owners, superowners and approvers, the owners having authority to approve changes in members for a group, the superowners having authority to approve changes in owners for a group, the approvers having authority to approve changes in members for a group but only for a predetermined limited time period,
   wherein the administrators include at least one role that does not have direct access to change a master network information service (NIS) group map for the Unix environment, and
   wherein the administrators also include at least one role that does not include root privileges to the Unix environment;
  a NIS converter that accesses the group information database, and generates a NIS group file that describes a group and its members in a format that is NIS-compatible,
   wherein the NIS converter generates an updated NIS group file each time the group management engine makes a change that would affect the NIS group file, and
   wherein the NIS group file is incorporated into the master NIS group map via the #include# <filename> construct;
  a log module coupled to the group management engine, the log module recording changes to the groups and members; and
  a notification module coupled to the group management engine, the notification module sending notifications according to the commands executed by the group management engine, wherein the notifications include a notification that a member is about to expire from a group; and
 a processor to execute the instructions.

2. The group management system of claim 1 wherein membership in a group for at least one member is defined relative to a time period, and the group management engine automatically executes changes in membership based on such a definition.

3. The group management system of claim 1 wherein at least one member is defined as a temporary member, whose membership ends on a termination date, the group management engine automatically deleting the member defined as a temporary member as of that termination date.

4. The group management system of claim 1 wherein at least one member is defined as a future member, whose membership starts on a joining date, the group management engine automatically adding the member defined as a future member as of that joining date.

5. The group management system of claim 1 wherein the notifications include a notification that a member has been renewed for a group.

6. A method of managing groups in a Unix environment, the method comprising:
 storing hierarchical information and attributes about groups and their members in a group information database hosted by a secure server,
  wherein the group information database is a structured query language (SQL) database, and
  wherein at least one member is defined as an episodic member, whose membership repeatedly starts and ends according to a predetermined schedule;
 automatically adding and deleting the member defined as an episodic member according to the predetermined schedule;
 executing, by a group management engine, commands received from administrators of a group via the Unix command line interface to change attributes of members in the group,
  wherein the administrators include roles for owners, superowners and approvers, the owners having authority to approve changes in members for a group, the superowners having authority to approve changes in owners for a group, the approvers having authority to approve changes in members for a group but only for a predetermined limited time period,
  wherein the administrators include at least one role that does not have direct access to change a master network information service (NIS) group map for the Unix environment, wherein the administrators also include at least one role that does not include root privileges to the Unix environment, and wherein the group management engine operates on the hierarchical information and supports inheritance of the attributes based on the hierarchical information;

accessing the group information database to generate a NIS group file that describes a group and its members in a format that is NIS-compatible, wherein an updated NIS group file is generated each time the group management engine makes a change that would affect the NIS group file;

incorporating the NIS group file into the master NIS group map via the #include# <filename> construct;

recording changes to the groups and members made by the group management engine; and sending notifications according to the commands executed by the group management engine, wherein the notifications include a notification that a member is about to expire from a group.

7. The method of claim 6 wherein membership in a group for at least one member is defined relative to a time period, and further comprising automatically executing changes in membership based on such a definition.

8. The method of claim 6 wherein at least one member is defined as a temporary member, whose membership ends on a termination date, and further comprising automatically deleting the member defined as a temporary member as of that termination date.

9. The method of claim 6 wherein at least one member is defined as a future member, whose membership starts on a joining date, and further comprising automatically adding the member defined as a future member as of that joining date.

10. The method of claim 6 wherein the notifications include a notification that a member has been renewed for a group.

* * * * *